United States Patent
Okamura

(10) Patent No.: US 7,379,116 B2
(45) Date of Patent: May 27, 2008

(54) IMAGE PICKUP APPARATUS WITH COMBINED FLASH ANGLE AND FOCUSED MOTOR CONTROL

(75) Inventor: Satoshi Okamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 856 days.

(21) Appl. No.: 10/802,565

(22) Filed: Mar. 17, 2004

(65) Prior Publication Data

US 2004/0174454 A1 Sep. 9, 2004

Related U.S. Application Data

(62) Division of application No. 09/354,081, filed on Jul. 15, 1999, now Pat. No. 6,788,345.

(30) Foreign Application Priority Data

Jul. 22, 1998 (JP) ............................... 10-206667

(51) Int. Cl.
 *H04N 5/225* (2006.01)
 *H04N 5/232* (2006.01)
(52) U.S. Cl. ....................... 348/371; 348/345
(58) Field of Classification Search ............... 348/371, 348/345
 See application file for complete search history.

(56) References Cited

U.S. PATENT DOCUMENTS

| | | | | | |
|---|---|---|---|---|---|
| 4,881,128 | A | * | 11/1989 | Yamada | 348/370 |
| 5,610,723 | A | * | 3/1997 | Yamagishi | 386/75 |
| 5,652,920 | A | * | 7/1997 | Kaihara et al. | 396/62 |
| 5,703,638 | A | * | 12/1997 | Ohta et al. | 348/220.1 |
| 5,892,987 | A | * | 4/1999 | Ohmori | 396/61 |
| 5,911,085 | A | * | 6/1999 | Fuke et al. | 396/62 |
| 6,035,135 | A | * | 3/2000 | Okamura | 396/61 |
| 6,788,345 | B1 | * | 9/2004 | Okamura | 348/371 |

* cited by examiner

*Primary Examiner*—James M. Hannett
(74) *Attorney, Agent, or Firm*—Cowan, Liebowitz & Latman, P.C.

(57) ABSTRACT

In an image pickup apparatus capable of picking up an image as a moving image, the image pickup apparatus is able to record at least one of a still image and a sound and is able to change at least one of a focal length of an image forming optical system and an illuminating angle of a flash device, and the image pickup apparatus, when recording the at least one of the still image and the sound, is prevented from changing the at least one of the focal length of the image forming optical system and the illuminating angle of the flash device. Further, there are provided a control method for the image pickup apparatus and a computer program product for controlling the image pickup apparatus.

11 Claims, 4 Drawing Sheets

IMAGE PICKUP APPARATUS WITH COMBINED FLASH ANGLE AND FOCUSED MOTOR CONTROL

CROSS-REFERENCE TO RELATED APPLICATIONS

This application is a divisional of application Ser. No. 09/354,081, filed Jul. 15, 1999, now U.S. Pat. No. 6,788,345.

BACKGROUND OF THE INVENTION

1. Field of the Invention

The present invention relates to an image pickup apparatus capable of picking up an image as a moving image and also capable of recording at least one of a still image and a sound.

2. Description of Related Art

Use of a flash device is necessary in taking a picture (in picking up an image) of a low luminance object of shooting even for image pickup apparatuses, such as electronic cameras and the like, of these days. The guide numbers of flash devices are arranged to be controllable by varying their illuminating angles. The guide number is a value indicative of the amount of light emission by a flash device.

The amount of light emission by a flash device can be controlled according to a magnification by interlocking the control of the guide number with the control of a variator lens. Such a control arrangement permits taking a shot of an object with an adequate amount of exposure.

In carrying out control over the guide number of a flash device according to a magnification by interlocking the control of the guide number with the control of a variator lens as mentioned above, however, there arises the following problem. In a case where the flash device is of the kind capable of controlling the amount of light emission, when the variator lens is controlled for an arbitrary magnification at the timing of picking up a still image while using flash emission, the guide number of the flash device is caused to vary accordingly. Then, in such a case, it is hardly possible to make an apposite exposure for obtaining an adequate result of shooting.

Further, in the case of a video camera which is arranged to record a sound simultaneously with a still image in recording the still image, there is such a disadvantage that any operating sound generated from the variator lens or the flash device at the time of varying the magnification would be recorded in picking up the still image.

BRIEF SUMMARY OF THE INVENTION

In accordance with one aspect of the invention, there is provided an image pickup apparatus capable of picking up an image as a moving image, the image pickup apparatus being able to record at least one of a still image and a sound and able to change at least one of a focal length of an image forming optical system and an illuminating angle of a flash device, and the image pickup apparatus, when recording the at least one of the still image and the sound, being prevented from changing the at least one of the focal length of the image forming optical system and the illuminating angle of the flash device.

In accordance with other aspects of the invention, there are provided a control method for the image pickup apparatus and a computer program product for controlling the image pickup apparatus.

The above and further aspects of the invention will become apparent from the following detailed description of preferred embodiments thereof taken in conjunction with the accompanying drawings.

DETAILED DESCRIPTION OF THE INVENTION

Hereinafter, preferred embodiments of the invention will be described in detail with reference to the drawings.

Each of the embodiments described below is an image pickup apparatus of the type having a built-in flash device. However, the invention is not limited to such a type but is applicable also to an image pickup apparatus using an external flash device. While the image pickup apparatus according to each of the embodiments is arranged to record a still image and a sound in a memory, the invention applies also to a case where the image pickup apparatus is arranged to output the picked-up still image and the inputted sound to the outside either by wire or in a wireless manner. While the image pickup apparatus according to each of the embodiments uses the flash device of the kind arranged to vary the amount of light emission by varying the illuminating angle, the invention applies also to a case where the image pickup apparatus uses a flash device of the kind arranged to vary both the illuminating angle and the amount of light emission separately from each other. Further, while the image pickup apparatus according to each of the embodiments is arranged to give instructions for input of a still image and a sound and to vary the magnification by means of switches, the arrangement may be changed to give such instructions by wire or in a wireless manner from outside.

Further, while the invention is applied to an image pickup apparatus in the case of each of the embodiments described below, the invention applies also to a method for control over an image pickup apparatus, or to a computer program product, such as a storage medium, which stores therein a computer program for executing such a control method.

Figure 1:
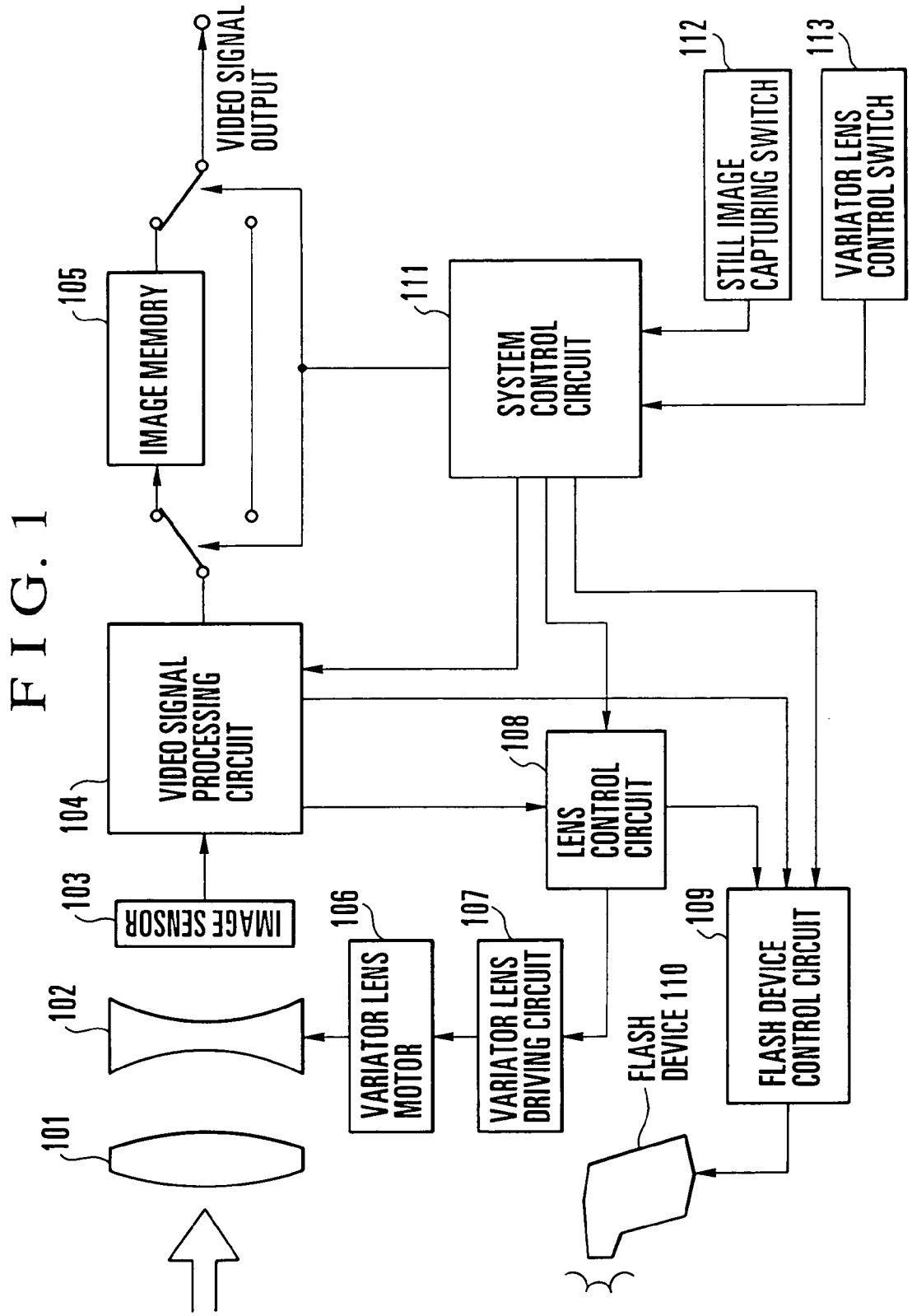
FIG. 1 is a block diagram showing the arrangement of an image pickup apparatus according to a first embodiment of the invention.

FIG. 1 is a block diagram showing the arrangement of an image pickup apparatus having a flash device according to a first embodiment of the invention. In FIG. 1, there are illustrated an image forming lens 101, a variator lens 102 arranged to vary an image magnification, the image forming lens 101 and the variator lens 102 constituting an image forming optical system, an image sensor 103 arranged to photo-electrically convert light incident thereon, a video signal processing circuit 104 arranged to form luminance and chrominance signals from a signal formed by the image sensor 103, and an image memory 105 arranged to record as a still image a video signal supplied from the video signal processing circuit 104.

There are further illustrated a still image capturing switch 112, a variator lens control switch 113, and a system control circuit 111 which is composed of a microcomputer, etc., arranged to control the whole system of the image pickup apparatus. Signals outputted from the still image capturing switch 112 and the variator lens control switch 113 are sent to the system control circuit 111 to be supplied to applicable parts.

There are further illustrated a variator lens motor 106 provided for driving the variator lens 102, a variator lens driving circuit 107 arranged to control the variator lens motor 106, and a lens control circuit 108 arranged to send a signal to the variator lens driving circuit 107 according to an output from the system control circuit 111.

There are further illustrated a flash device 110 capable of varying the guide number by changing the illuminating angle, and a flash device control circuit 109 which is composed of a microcomputer, etc., arranged to control the flash device 110.

Light from an object of shooting, having passed through the image forming lens 101 and the variator lens 102, is made incident on the image sensor 103 to form an image thereon. The incident light is photo-electrically converted by the image sensor 103 into an electrical signal, which is then supplied to the video signal processing circuit 104 to form a video signal. When a signal is sent from the still image capturing switch 112 to the system control circuit 111, the system control circuit 111 forms a still image capturing signal.

When there is formed no still image capturing signal, the image pickup apparatus outputs a moving image. On the other hand, when the still image capturing switch 112 is turned on, the system control circuit 111 forms the still image capturing signal to cause the video signal from the video signal processing circuit 104 to be supplied to the image memory 105 and then to cause an image stored in the image memory 105 to be outputted until the still image capturing signal ceases to be outputted any longer, so that the image pickup apparatus outputs a still image.

When a signal from the variator lens control switch 113 is supplied to the system control circuit 111, the system control circuit 111 forms a variator lens control signal. The lens control circuit 108 then controls the variator lens driving circuit 107 according to the variator lens control signal. The variator lens driving circuit 107 is thus caused to drive the variator lens motor 106. Then, the variator lens motor 106 moves the variator lens 102 to vary the magnification (i.e., the focal length of the image forming optical system). With the magnification thus varied, the lens control circuit 108 supplies magnification varying information to the flash device control circuit 109.

Upon receipt of the magnification varying information from the lens control circuit 108, the flash device control circuit 109 controls the illuminating angle of the flash device 110 according to the magnification varying information. Light emission of the flash device 110 is then controlled with the flash device 110 triggered by the control of the amount of light emission of the flash device 110 and the still image capturing signal.

A control operation on the guide number of the flash device 110 to be performed according to the operation on the variator lens control switch 113 is next described below with reference to the flow chart shown in FIG. 2.

Figure 2:
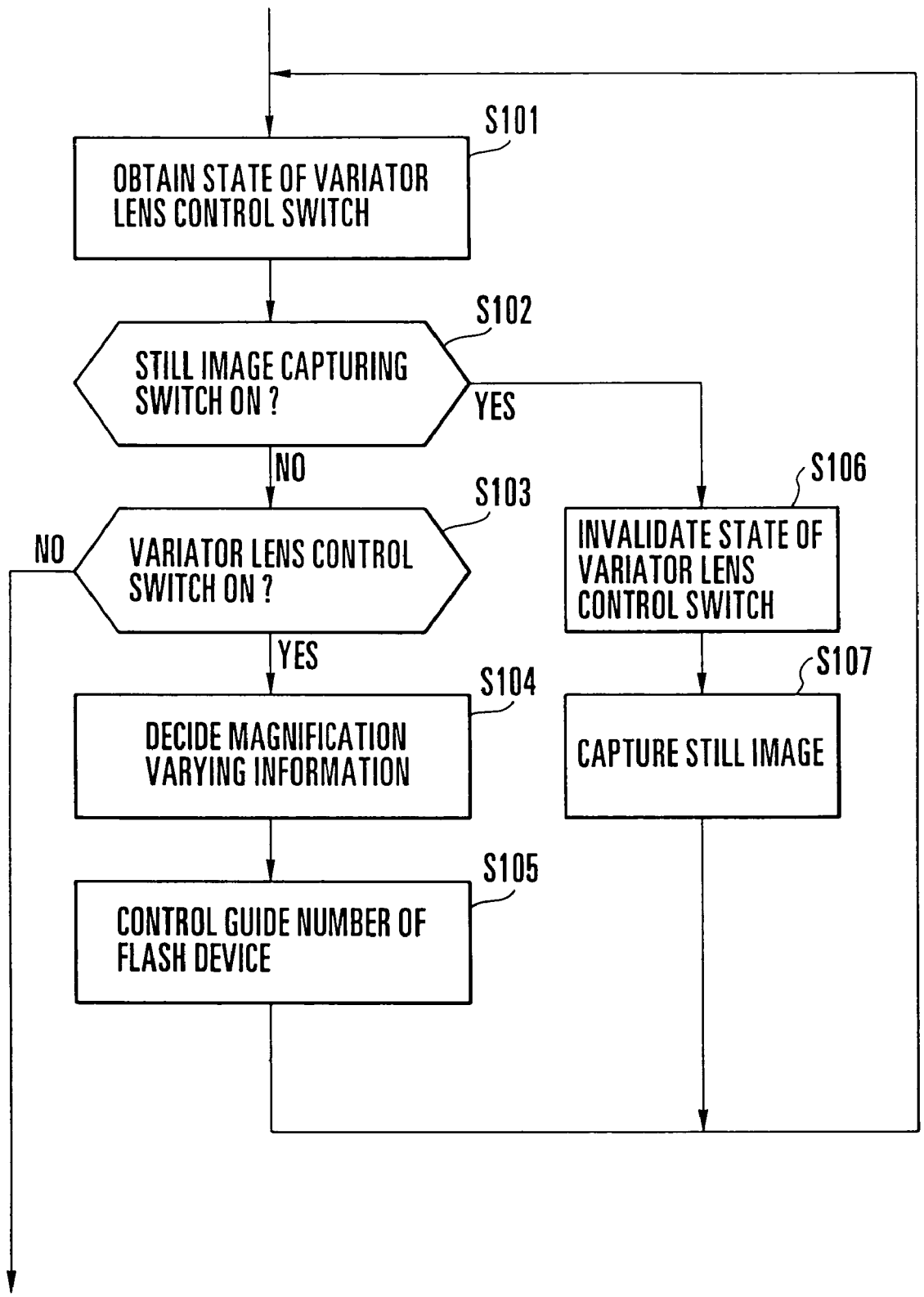
FIG. 2 is a flow chart showing an operation of the image pickup apparatus shown in FIG. 1.

At a step S101 of FIG. 2, information about the state of the variator lens control switch 113 is first obtained. At the next step S102, a check is made to find if the still image capturing switch 112 is turned on. If not, the flow of operation proceeds to a step S103. At the step S103, a check is made to find if the variator lens control switch 113 is turned on. If so, the flow proceeds to a step S104. At the step S104, the lens control circuit 108 causes the variator lens driving circuit 107 to drive the variator lens motor 106, thereby moving the variator lens 102 to vary the magnification, so that magnification varying information is decided. The flow then proceeds from the step S104 to a step S105. At the step S105, the guide number of the flash device 110 is controlled, with the illuminating angle thereof changed by a motor (not shown) incorporated therein, by the flash device control circuit 109 in such a way as to make the guide number of the flash device 110 correspond to the magnification varying information. On the other hand, if the variator lens control switch 113 is found at the step S103 to be not turned on, the flow of operation comes to an end.

When the still image capturing switch 112 is turned on, an image obtained at the time of flash emission is recorded in the image memory 105. If the magnification varying information is caused to be sent from lens control circuit 108 to the flash device control circuit 109 by the variator lens control signal outputted from the system control circuit 111 with the variator lens control switch 113 turned on before the amount of light emission by the flash device 110 reaches an amount designated by the flash device control circuit 109 after the still image capturing switch 112 is turned on, the illuminating angle and the guide number of the flash device 110 would be caused to vary. In such a case, because, as a result, the amount of light emission obtained at the time of picking up a still image would be caused to vary, it is hardly possible to obtain any adequate result of an apposite exposure.

Therefore, if the still image capturing switch 112 is found at the step S102 to be turned on, the flow proceeds to a step S106, where the system control circuit 111 invalidates the state of the variator lens control switch 113. According to this arrangement, it is possible to prevent the amount of light emission from varying as the result of a change of the guide number at the time of picking up a still image, so that a result of an apposite exposure can be adequately obtained.

Figure 3:
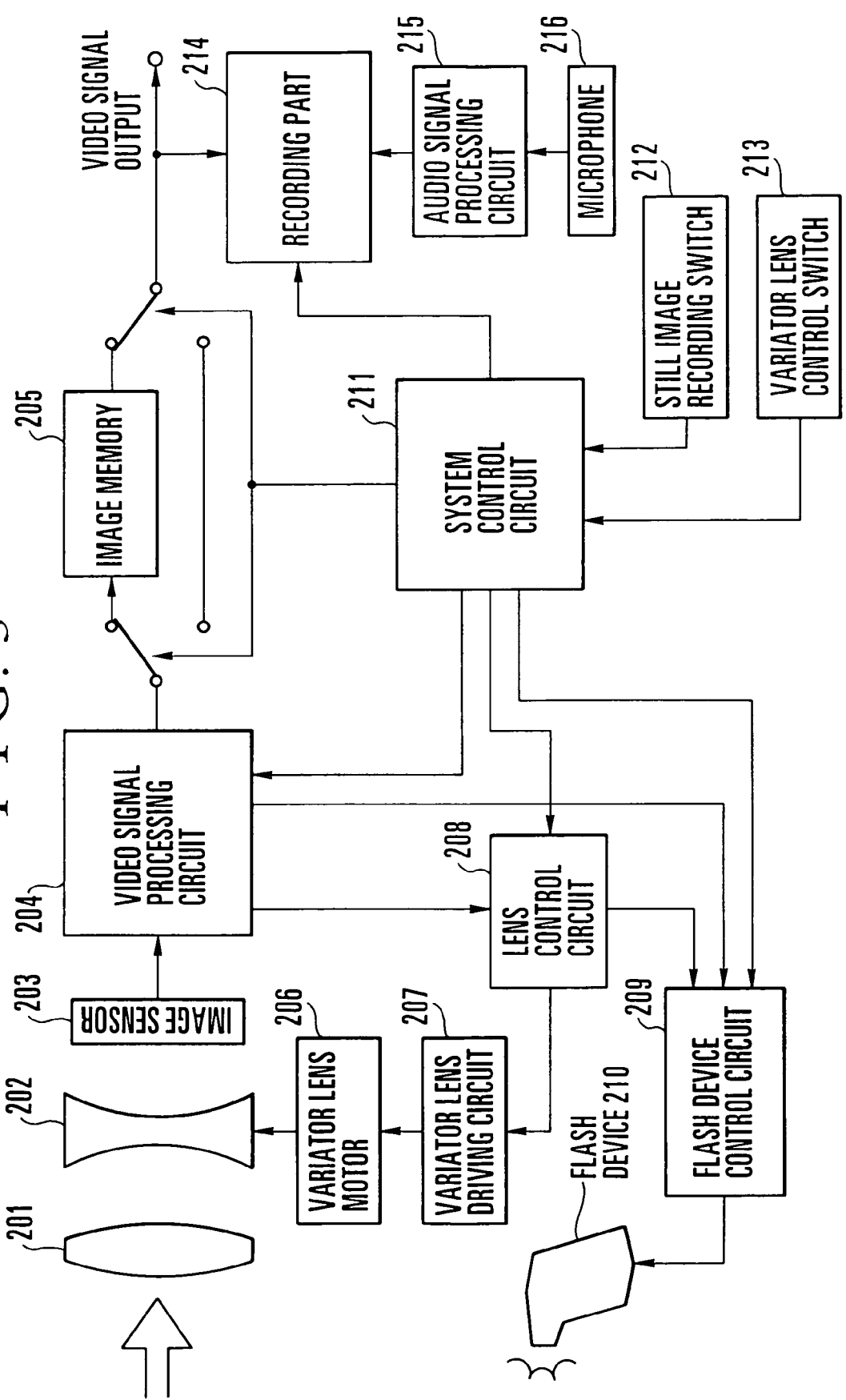
FIG. 3 is a block diagram showing the arrangement of an image pickup apparatus according to a second embodiment of the invention.

FIG. 3 is a block diagram showing the arrangement of an image pickup apparatus having a flash device according to a second embodiment of the invention. In FIG. 3, there are illustrated an image forming lens 201, a variator lens 202 arranged to vary an image magnification, the image forming lens 201 and the variator lens 202 constituting an image forming optical system, an image sensor 203 arranged to photo-electrically convert light incident thereon, a video signal processing circuit 204 arranged to form luminance and chrominance signals from a signal formed by the image sensor 203, an image memory 205 arranged to record as a still image a video signal supplied from the video signal processing circuit 204, a still image recording switch 212, a variator lens control switch 213, and a system control circuit 211 which is composed of a microcomputer, etc., arranged to send, to applicable parts, signals outputted from the still image recording switch 212 and the variator lens control switch 213.

There are further illustrated a variator lens motor 206 provided for driving the variator lens 202, a variator lens driving circuit 207 arranged to control the variator lens motor 206, and a lens control circuit 208 arranged to send a signal to the variator lens driving circuit 207 according to an output from the system control circuit 211.

There are further illustrated a flash device 210 capable of arbitrarily varying the illuminating angle, and a flash device control circuit 209 which is composed of a microcomputer, etc., arranged to control the flash device 210.

There are further illustrated a microphone 216 arranged to pick up a sound on the outside of the image pickup apparatus, an audio signal processing circuit 215 arranged to form an audio signal from an electrical signal outputted from the microphone 216, and a recording part 214 arranged to record the video signal and the audio signal in accordance with instructions from the system control circuit 211.

Light from an object of shooting, having passed through the image forming lens 201 and the variator lens 202, is made incident on the image sensor 203 to form an image thereon. The incident light is photo-electrically converted into an electrical signal, which is then supplied to the video signal processing circuit 204 to form a video signal. When a signal is sent from the still image recording switch 212 to the system control circuit 211, the system control circuit 211 then forms a still image recording control signal.

When the still image recording switch 212 is turned on, the system control circuit 211 forms the still image recording control signal to cause the video signal from the video signal processing circuit 204 to be supplied to the image memory 205, and then to cause the video signal stored as a still image in the image memory 205 and the audio signal formed by the audio signal processing circuit 215 from the signal inputted from the microphone 216 to be recorded in the recording part 214.

When a signal from the variator lens control switch 213 is supplied to the system control circuit 211, the system control circuit 211 forms a variator lens control signal. The lens control circuit 208 controls the variator lens driving circuit 207 according to the variator lens control signal. The variator lens driving circuit 207 is thus caused to drive the variator lens motor 206. Then, the variator lens motor 206 moves the variator lens 202 to vary the magnification. With the magnification thus varied, the lens control circuit 208 supplies magnification varying information to the flash device control circuit 209.

Upon receipt of the magnification varying information from the lens control circuit 208, the flash device control circuit 209 controls the illuminating angle of the flash device 210 according to the magnification varying information.

A control operation on the illuminating angle of the flash device 210 to be performed according to the operation on the variator lens control switch 213 is next described below with reference to the flow chart shown in FIG. 4.

Figure 4:
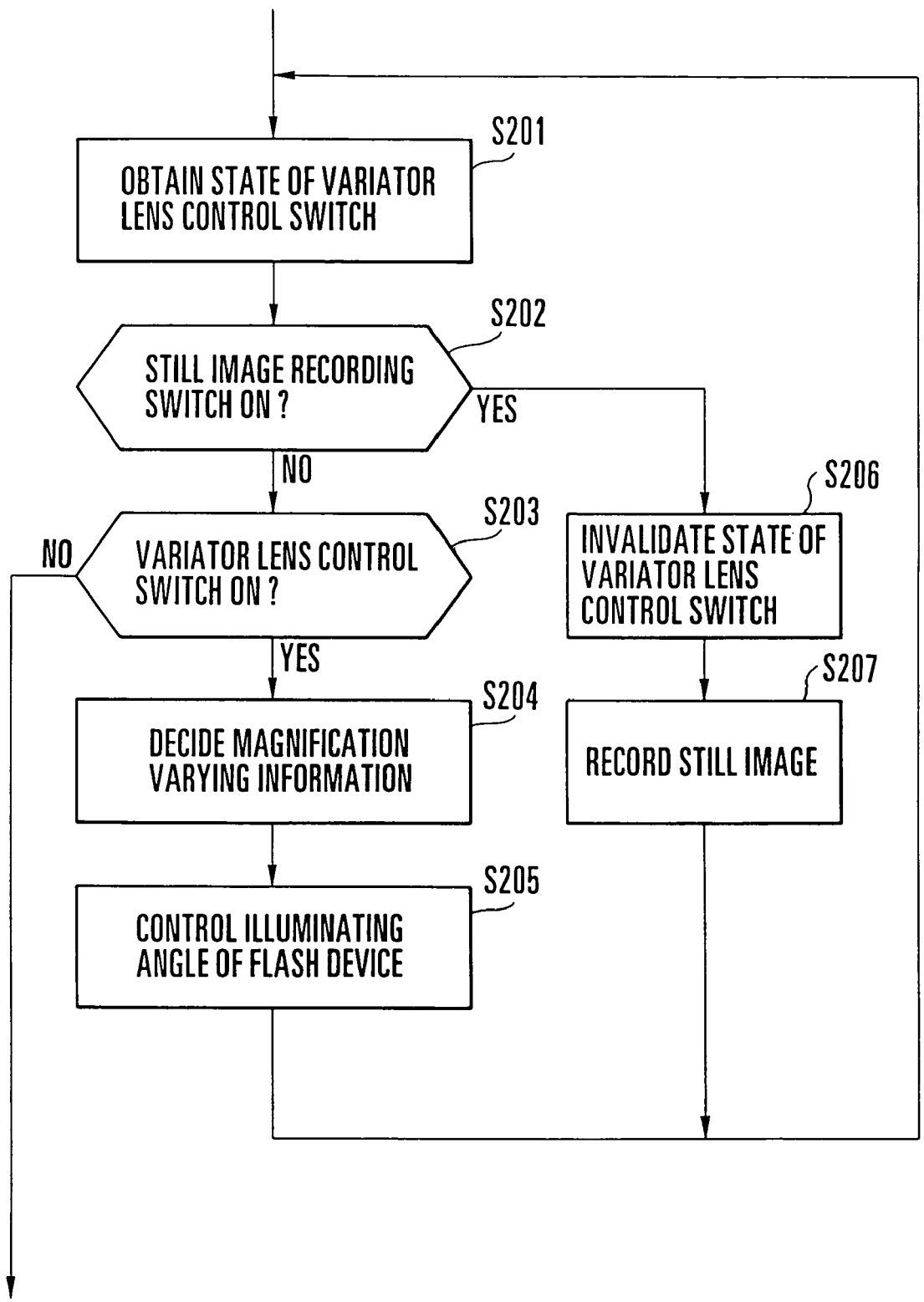
FIG. 4 is a flow chart showing an operation of the image pickup apparatus shown in FIG. 3.

At a step S201 of FIG. 4, information about the state of the variator lens control switch 213 is first obtained. At the next step S202, a check is made to find if the still image recording switch 212 is turned on. If not, the flow of operation proceeds to a step S203. At the step S203, a check is made to find if the variator lens control switch 213 is turned on. If so, the flow proceeds to a step S204. At the step S204, the lens control circuit 208 causes the variator lens driving circuit 207 to drive the variator lens motor 206, thereby moving the variator lens 202 to vary the magnification, so that magnification varying information is decided. At the next step S205, the illuminating angle of the flash device 210 is controlled with a motor (not shown) incorporated therein by the flash device control circuit 209 in such a way as to correspond to the magnification varying information.

When the still image recording switch 212 is turned on, the still image stored in the image memory 205 in synchronism with the flash emission and the audio signal outputted from the audio signal processing circuit 215 are recorded in the recording part 214. If the variator lens control switch 213 is in its on-state during process of the recording, the lens control circuit 208 outputs the variator lens control signal and the magnification varying information. As a result, the variator lens driving circuit 207 is caused to move the variator lens 202 and the flash device control circuit 209 is caused to change the illuminating angle of the flash device 210. In this instance, an operating sound generated from the variator lens 202 or the flash device 210 would be picked up by the microphone 216 and then be recorded in the recording part 214. Under such a condition, a sound which is originally intended to be recorded would be affected by the operating sound.

Therefore, if the still image recording switch 212 is found at the step S202 to be in its on-state, the flow proceeds to a step S206, where the system control circuit 211 invalidates the state of the variator lens control switch 213. According to this arrangement, it is possible to prevent the operating sounds which would be generated during the magnification varying operation of the variator lens 202 and during the illuminating-angle changing operation of the flash device 210 from being recorded through the microphone 216, so that a sound which is originally intended to be recorded can be clearly recorded.

The individual components shown in schematic or block form in the drawings are all well-known in the camera arts and their specific construction and operation are not critical to the operation or best mode for carrying out the invention.

While the present invention has been described with respect to what is presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, while, in each of the embodiments described above, no specific description is made about recording of a moving image, the invention is of course applicable also to an apparatus capable of recording a moving image or capable of recording a sound and a moving image simultaneously.

Further, while, in the image pickup apparatus according to each of the embodiments, both the variation of the focal length of the image forming optical system and the change of the illuminating angle of the flash device are performed, the invention is applicable also to an image pickup apparatus in which only one of the variation of the focal length of the image forming optical system and the change of the illuminating angle of the flash device is performed. In addition, while, in the second embodiment, recording of a sound is performed together with recording of a still image, the invention is applicable also to an image pickup apparatus in which recording of a sound is solely performed or is recorded together with recording of a moving image. Accordingly, the invention is widely applicable to various image pickup apparatuses in which, when at least one of a still image and a sound is recorded, at least one of the focal length of an image forming optical system and the illuminating angle of a flash device is made unchangeable.

Further, the invention is also applicable to various image pickup apparatuses in which, when at least one of a still image and a sound is recorded, the change of at least one of the focal length of an image forming optical system and the illuminating angle of a flash device is not entirely inhibited but there is provided a manual operation means for canceling such inhibition, or there is provided some limitation, such as a warning display, without the above-mentioned inhibition.

Further, in addition to an image pickup apparatus in which, when at least one of a still image and a sound is recorded, at least one of the focal length of an image forming optical system and the illuminating angle of a flash device is made unchangeable, the invention is also applicable to various image pickup apparatuses in which, when at least one of the focal length of an image forming optical system and the illuminating angle of a flash device is changed, at least one of a still image and a sound is made unrecordable, or the illuminating angle of a flash device is replaced with the illuminating direction of the flash device.

Further, the software arrangement and the hardware arrangement in each of the embodiments may be adaptively replaced with each other.

Further, in the invention, the embodiments described above or the technical elements thereof may be combined with each other according to necessity.

Further, the invention also applies to cases where each claim or the whole or a part of the arrangement of each of the embodiments constitutes one apparatus or is used in combination with another apparatus or as a component element of an apparatus.

Further, the invention is also applicable to various types of cameras, such as an electronic still camera, a video camera and a camera using a silver-halide film, various image pickup apparatuses other than cameras, various optical apparatuses and other types of apparatuses, and, moreover, to apparatuses adapted for the cameras, the image pickup apparatuses, optical apparatuses and the other types of apparatuses, and elements constituting the above-mentioned apparatuses.

The invention claimed is:

1. An image pickup apparatus capable of picking up an image as a moving image, comprising:
    (A) a recording device which records at least a still image in a still image mode;
    (B) a first changing device which changes a focal length of an image forming optical system;
    (C) a second changing device which changes an illuminating angle of a flash device; and
    (D) a control device which controls said first changing device and said second changing device to change the illuminating angle of the flash device in accordance with the change in the focal length until a mode of said recording device is changed to the still image mode, and restrains said second changing device from changing the illuminating angle of the flash device during the still image mode.

2. An image pickup apparatus according to claim 1, wherein said first changing device includes a motor for changing the focal length of the image forming optical system.

3. An image pickup apparatus according to claim 1, wherein said second changing device includes a motor for changing the illuminating angle of the flash device.

4. An image pickup apparatus according to claim 1, further comprising:
    an operation member which issues an instruction for causing said recording device to record said still image, said control device becoming operative to restrain said second changing device from changing the illuminating angle of the flash device in response to the instruction from said operation member.

5. An image pickup apparatus capable of picking up an image as a moving image, comprising:
    (A) a recording device which records at least a still image in a still image mode;
    (B) a first changing device which changes a focal length of an image forming optical system;
    (C) a second changing device which changes an illuminating angle of a flash device; and
    (D) a control device which controls said first changing device and said second changing device to change the illuminating angle of the flash device in accordance with the change in the focal length until a mode of said recording device is changed to the still image mode, and restrains said first changing device from changing the focal length of an image forming optical system during the still image mode.

6. An image pickup apparatus according to claim 5, wherein said first changing device includes a motor for changing the focal length of the image forming optical system.

7. An image pickup apparatus according to claim 5, further comprising:
    an operation member which issues an instruction for causing said recording device to record the still image, said control device, in response to the instruction from said operation member, restraining said first changing device from changing the focal length of an image forming optical system.

8. An image pickup apparatus capable of picking up an image as a moving image, comprising:
    (A) a recording device which records at least a still image in a still image mode;
    (B) a first changing device which changes a focal length of an image forming optical system;
    (C) a second changing device which changes an illuminating direction of a flash device; and
    (D) a control device which controls said first changing device and said second changing device to change the illuminating direction of the flash device in accordance with the change in focal length until a mode of said recording device is changed to the still image mode, and restrains said second changing device from changing the illuminating direction during the still image mode.

9. An image pickup apparatus according to claim 8, wherein said first changing device includes a motor for changing the illuminating direction of the flash device.

10. A control method for an image pickup apparatus capable of picking up an image as a moving image, comprising the steps of:
    (A) recording at least a still image in a still image mode;
    (B) first changing a focal length of an image forming optical system;
    (C) second changing an illuminating angle of a flash device; and
    (D) controlling said first changing and said second changing to change the illuminating angle of the flash device in accordance with the change in the focal length until a mode of said recording is changed to the still image mode, and to restrain said second changing from changing the illuminating angle of the flash device during the still image mode.

11. A control method for an image pickup apparatus capable of picking up an image as a moving image, comprising the steps of:
    (A) recording at least a still image in a still image mode;
    (B) first changing a focal length of an image forming optical system;
    (C) second changing an illuminating direction of a flash device; and
    (D) controlling said first changing and said second changing to change the illuminating direction of the flash device in accordance with the change in the focal length until a mode of said recording is changed to the still image mode, and to restrain said second changing from changing the illuminating direction of the flash device during the still image mode.

* * * * *

UNITED STATES PATENT AND TRADEMARK OFFICE
CERTIFICATE OF CORRECTION

| | | |
|---|---|---|
| PATENT NO. | : 7,379,116 B2 | Page 1 of 1 |
| APPLICATION NO. | : 10/802565 | |
| DATED | : May 27, 2008 | |
| INVENTOR(S) | : Satoshi Okamura | |

It is certified that error appears in the above-identified patent and that said Letters Patent is hereby corrected as shown below:

Title page, Item (54) and col. 1, lines 1-3, delete "IMAGE PICKUP APPARATUS WITH COMBINED FLASH ANGLE AND FOCUSED MOTOR CONTROL" and insert -- IMAGE PICKUP APPARATUS WITH COMBINED FLASH ANGLE AND FOCUS MOTOR CONTROL --

Signed and Sealed this

Second Day of September, 2008

JON W. DUDAS
*Director of the United States Patent and Trademark Office*